US008631925B1

(12) United States Patent
Hanson et al.

(10) Patent No.: US 8,631,925 B1
(45) Date of Patent: Jan. 21, 2014

(54) ADJUSTING MECHANISM FOR ROLLS ON A ROLL STAND ASSEMBLY

(75) Inventors: Dana R. Hanson, St. Charles, IL (US); Ryan E. Leopold, Aurora, IL (US)

(73) Assignee: Processing Technologies, LLC, Aurora, IL (US)

( * ) Notice: Subject to any disclaimer, the term of this patent is extended or adjusted under 35 U.S.C. 154(b) by 0 days.

(21) Appl. No.: 13/611,050

(22) Filed: Sep. 12, 2012

(51) Int. Cl.
*B65G 37/00* (2006.01)
*B65G 21/00* (2006.01)

(52) U.S. Cl.
USPC .......................................... 198/571; 198/586

(58) Field of Classification Search
USPC .............. 198/571, 586, 781.06, 860.1, 861.1, 198/608, 624; 193/35 R
See application file for complete search history.

(56) References Cited

U.S. PATENT DOCUMENTS

| | | | | |
|---|---|---|---|---|
| 1,887,434 A | * | 11/1932 | Sammis .......................... | 198/624 |
| 4,510,981 A | * | 4/1985 | Biller ............................. | 198/586 |
| 4,765,273 A | * | 8/1988 | Anderle .......................... | 198/624 |
| 5,194,081 A | * | 3/1993 | Trevelyan et al. ............ | 65/29.21 |
| 5,346,203 A | * | 9/1994 | Stemmle ......................... | 271/288 |
| 5,497,985 A | * | 3/1996 | Byttebier et al. .............. | 198/586 |
| 6,179,116 B1 | * | 1/2001 | Noniewicz et al. ........ | 198/861.1 |
| 8,371,354 B2 | * | 2/2013 | Phillips .......................... | 156/510 |

* cited by examiner

*Primary Examiner* — James R Bidwell
(74) *Attorney, Agent, or Firm* — Wood, Phillips, Katz, Clark & Mortimer

(57) ABSTRACT

A roll stand assembly for processing a sheet product and having a frame and a plurality of rolls operatively position on the frame so as to define a plurality of nip locations between cooperating pairs of the rolls. The roll axes are substantially parallel with the plurality of rolls operatively positioned on the frame. Two of the rolls are relatively repositionable by guided relative movement therebetween along a first path to vary a gap between the two rolls. The two rolls are relatively repositionable by guided relative movement therebetween along a second path that is different than the first path to vary the gap between the two rolls. A control system is provided through which the two rolls are relatively repositioned by causing guided relative movement between the two rolls in the first and second paths.

20 Claims, 14 Drawing Sheets

ADJUSTING MECHANISM FOR ROLLS ON A ROLL STAND ASSEMBLY

BACKGROUND OF THE INVENTION

1. Field of the Invention

This invention relates to a roll stand assembly as used to form and handle sheet material and, more particularly, to a roll stand assembly having rolls that are relatively repositionable to control gaps between the rolls.

2. Background Art

A myriad of different configurations of roll stand assemblies currently exists for making and handling sheet material. On roll stand assemblies, rolls cooperate to facilitate sheet formation, as by extrusion, and handling of sheets as during treatment, component combination and conveyance. Typically, cooperating rolls will have sheet engaging surfaces, each centered on an axis. The axes of the cooperating rolls are substantially parallel. During sheet formation and handling, a controlled gap is set and maintained, with the gap dimension being determined by the particular process and product. The rolls are relatively repositionable to an "open state" to allow the gaps to be enlarged, as to facilitate access therethrough for assembly, repair, and maintenance of the roll stand assembly.

In certain applications, multiple "nip" locations are formed on the same roll stand assembly where cooperating sheet engaging surfaces converge in a downstream direction. In one exemplary form, one roll will cooperate with two adjacent rolls to produce separate nip locations on the same roll stand assembly. The center roll in this combination is typically capable of moving in a linear path to place the rolls in the aforementioned "open state", wherein the gaps between the center roll and both adjacent rolls are increased adequately so as to allow access therethrough for repair, maintenance, etc. Preparatory to operation, the center roll is moved oppositely to its opening direction to place the rolls in a "closed" or "operating" state wherein the sheet engaging surface on the center roll is brought into proximity to the sheet engaging surfaces on the adjacent rolls.

The ability to set and maintain a precise gap dimension between roll pairs is dictated by the relative alignment of all three rolls. While generally rolls used in extrusion forming processes are precisely formed, there are nonetheless tolerances that are permitted that often allow for, and result in, a skewing of alignment that produces large forces during operation that may stress system components, cause wear, and potentially contribute to a line breakdown that necessitates system downtime. Roll misalignment may also compromise the product produced using the roll stand assembly.

Heretofore, gap control has been effected principally by controllably moving the center roll in only a linear fashion relative to the adjacent rolls in a multi-nip design. System designers have relied upon the modicum of relative movement between the parts to cause a self-alignment. By doing so, there is a potential for one or more of the rolls to "float" during operation. As a result, the above-mentioned misalignment conditions may occur.

The industry to this point has operated systems with this inherent potential problem, given the fact that no commercially viable solution has been devised.

SUMMARY OF THE INVENTION

In one form, the invention is directed to a roll stand assembly for processing a sheet product. The roll stand assembly includes a frame with a plurality of rolls operatively positioned on the frame so as to define a plurality of nip locations between cooperating pairs of the rolls. The plurality of rolls includes: a) a first roll with a first axis; b) a second roll with a second axis; and c) a third roll with a third axis. The first, second, and third axes are substantially parallel with the plurality of rolls operatively positioned on the frame. Two of the rolls are relatively repositionable by guided relative movement therebetween along a first path to vary a gap between the two rolls. The two rolls are relatively repositionable by guided relative movement therebetween along a second path that is different than the first path to vary the gap between the two rolls. A control system is provided by which the two rolls are relatively repositioned by causing guided relative movement between the two rolls in the first and second paths.

In one form, the first path extends in a substantially straight line and the second path is transverse to the straight line.

In one form, the second path is arcuate.

In one form, the first and second axes are substantially fixed with respect to the frame and the third roll is movable relative to the first and second rolls in the first path to thereby vary: a) a first gap between the first and third roll; and b) a second gap between the second and third roll.

In one form, the third roll is movable in a substantially straight line in the first path.

In one form, the third roll is supported on a block that is in turn supported on a carrier. The carrier is movable in the straight line in the first path and the block is movable guidingly relative to the carrier to cause the third roll to move in the second path.

In one form, the block is mounted to the carrier for guided movement around a fourth axis that is spaced from and parallel to the third axis.

In one form, the control system has first and second force applying units that are engageable with the block respectively at first and second spaced locations. The first force applying unit is operable to exert a force upon the block at the first location that urges the block in one pivoting direction around the fourth axis. The second force applying unit is operable to exert a force upon the block at the second location that urges the block in a pivoting direction opposite to the one pivoting direction around the fourth axis.

In one form, the first and second force applying units are operable to simultaneously exert forces upon the block at the first and second locations throughout an operating pivot range for the block around the fourth axis.

In one form, the first force applying unit is a first component that is movable relative to a second component to cause first and second surfaces, respectively on the first and second components, to move one against the other to thereby produce a camming action that generates the force upon the block at the first location.

In one form, the second component moves as a unit with the block at the first location and the first component is movable relative to the second component and block to thereby produce the camming action.

In one form, one of the first and second surfaces is defined on a part that is movable on its respective component to avoid hang-up between the first and second surfaces as the first and second surfaces are moved against each other.

In one form, there are surfaces on the block and carrier that abut to limit pivoting movement of the block both in: a) the one pivoting direction; and b) the pivoting direction opposite to the one pivoting direction.

In one form, the frame has first and second frame parts that are spaced axially relative to the rolls. Each roll in the plurality of rolls spans between the first and second frame parts. The carrier, block and first and second force applying units are on the first frame part and there is substantially the same arrangement of carrier, block and force applying units on the second frame part as on the first frame part.

In one form, the part is pivoted relative to another part on its respective component and biased in one pivoting direction.

In one form, the carrier has a polygonal peripheral shape as seen in cross-section taken transversely to the straight line and defined by a plurality of flat surface portions. A guide structure is provided on the frame and defines a plurality of guide surface portions that each cooperates with one of the flat surface portions to cause the carrier to be guided in movement relative to the frame in the straight line.

In one form, the control system has a drive for moving the carrier, an operator for each of the first and second force applying units and a controller for coordinating operation of the drive and the operators for the first and second force applying units.

In one form, the control system includes at least one sensor that causes the controller to coordinate operation of the drive and the operators to automatically set the first and second gaps to preselected first and second dimensions.

In one form, the invention is directed to a method of operating a roll stand assembly. The method includes the steps of: providing a roll stand assembly as described above; with the third roll in an open position spaced from the first and second rolls to permit access to between the first, second, and third rolls, moving the carrier so as to move the third roll closer to each of the first and second rolls; and operating the first and second force applying units to set the first and second gaps to a desired operating dimension.

In one form, the step of providing a roll stand assembly involves providing a roll stand assembly wherein the control system has a drive for moving the carrier, an operator for each of the first and second force applying units and a controller for coordinating operation of the drive and operators for the first and second force applying units. The steps of moving the carrier and operating the first and second force applying units involve moving the carrier and operating the first and second force applying units automatically through programmed operation of the controller.

BRIEF DESCRIPTION OF THE DRAWINGS

FIG. 13 is an enlarged, fragmentary, side elevation view showing a cooperating block and carrier, which the movable roll is associated with;

DETAILED DESCRIPTION OF THE PREFERRED EMBODIMENT

Figure 1:
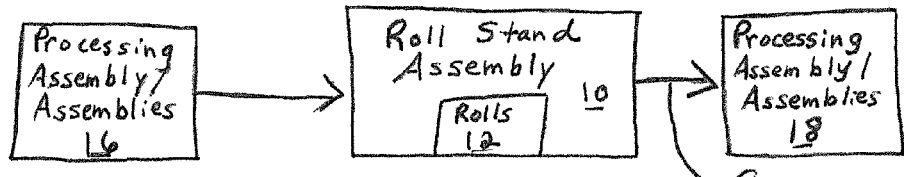
FIG. 1 is a schematic representation of a sheet forming/handling system incorporating a roll stand assembly for processing a sheet product, according to the present invention.

FIG. 1 schematically depicts a roll stand assembly 10 according to the present invention. The roll stand assembly 10 incorporates a plurality of rolls 12 for processing sheet products. Through the roll stand assembly 10, and the rolls 12 thereon, sheet products may be processed by being at least one of formed, as by extrusion, joined with other components, treated, conveyed, etc.

The roll stand assembly 10 is shown incorporated into a system at 14 that may include one or more upstream processing assemblies 16 and one or more downstream processing assemblies 18. The precise nature of the system 14 into which the roll stand assembly 10 is incorporated is not critical to the present invention.

Figure 2:
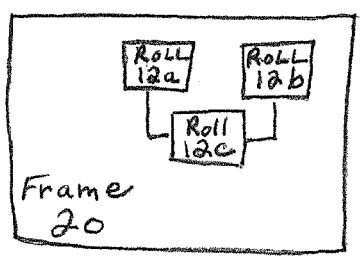
FIG. 2 is a more detailed, schematic representation of the inventive roll stand assembly shown in FIG. 1.

The basic components of the inventive roll stand assembly 10 are shown in FIG. 2 and include a frame 20 upon which at least first, second, and third rolls 12a, 12b, 12c are operatively positioned so as to define a plurality of nip locations between cooperating pairs of the rolls 12a-12c. As depicted, the roll 12c cooperates with each of the rolls 12a, 12b to define two spaced nip locations. It should be understood that the generic showing in FIGS. 1 and 2 is intended to encompass any number of rolls 12, from three in number to potentially many more such rolls that produce additional nip locations.

Figure 4:
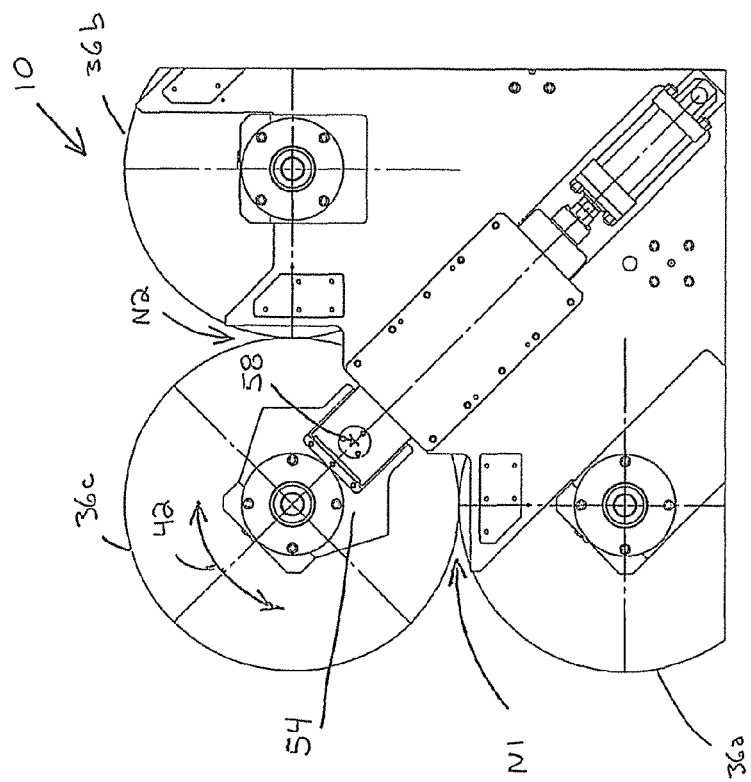
FIG. 4 is a view as in FIG. 3 wherein the rolls are in a closed state.
Figure 3:
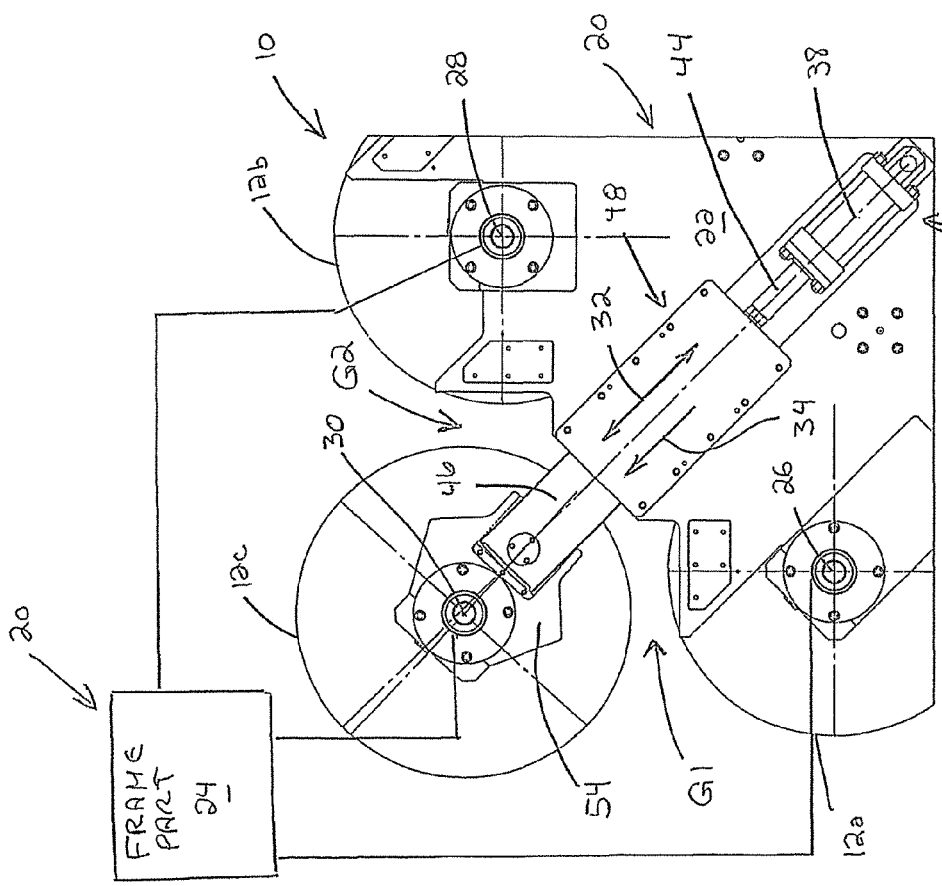
FIG. 3 is a partially schematic, fragmentary, side elevation view of one exemplary form of the roll stand assembly, shown schematically in FIG. 2, with three rolls thereon shown in an open state and selected components of a roll adjusting mechanism, according to the present invention, and with other components of the adjusting mechanism removed for clarity.

Referring now to FIGS. 3-17, one preferred form of the roll stand assembly 10 is shown. In FIGS. 3 and 4, the first, second and third rolls 12a, 12b, 12c are shown, whereas in some other figures the rolls and other structure have been left out to allow other components to be more readily seen.

As seen in FIG. 3, the frame 20 consists of frame parts 22, 24, between which the rolls 12a-12b span. The frame part 24 is shown schematically and is essentially a mirror image of the frame part 22.

The first roll 12a has a first axis 26, with the second roll 12b having a second axis 28 and the third roll 12c having a third axis 30. The first, second, and third axes 26-28 are substantially parallel with the rolls 12a-12c operatively positioned on the frame 20.

In the broadest form of the invention, as shown generically in FIGS. 1 and 2, two of the rolls 12a-12c are repositionable by guided relative movement therebetween along a first path to vary a gap between the two rolls. The two rolls are relatively repositionable by guided movement therebetween along a second path that is different than the first path to further vary the gap between the two rolls. In this broad sense, the relative movement can be effected by moving only one of the two rolls 12a-12c relative to the frame 20 and the other of the two rolls 12a-12c. Alternatively, each of the two rolls 12a-12c could be movable to effect the relative repositioning.

In the embodiment shown in FIGS. 3-17, the third roll 12c is repositionable relative to each of the rolls 12a, 12b, with the axes of the rolls 12a, 12b remaining substantially fixed relative to the frame 20. More specifically, the third roll 12c is guided in movement relative to the frame 20 and first and second rolls 12a, 12b in a linear first path, as indicated by the double-headed arrow 32. In FIG. 3, the rolls 12a-12c are shown in an open state wherein gaps G1, G2, respectively between rolls 12a, 12c and 12b, 12c, are large enough to allow an operator to direct his/her hands therebetween, as to adjust, maintain, and/or repair components otherwise blocked by the rolls 12a-12c. This open state for the roll stand assembly 10 is achieved by advancing the third roll 12c in the first path in the direction indicated by the arrow 34.

The third roll 12c is moved in the first path, opposite to the direction indicated by the arrow 34, to close the rolls as shown in FIG. 4, to place the roll stand assembly 10 in "closed" and "operating" state. In doing so, the dimensions of the gaps G1, G2 are reduced so that sheet engaging surfaces 36a, 36b and 36c, respectively on the rolls 12a, 12b, 12c, are brought into close proximity along their axial extent. In this state, the surfaces 36a, 36c produce a first nip location N1, with the second and third sheet engaging surfaces 36b, 36c producing a second nip location N2 where the cooperating surfaces converge in the downstream direction of travel of the sheet.

The third roll 12c is repositioned through a drive 38 that is part of a control system at 40 through which the rolls 12a-12c are repositioned by causing guided relative movement therebetween.

With the rolls 12a-12c closed as in FIG. 4, relative repositioning of the rolls 12a-12c is effected by moving the third roll 36c in a second, arcuate path, as indicated by the double-headed arrow 42, that is different than, and in this case transverse to, the first path. As noted above, the invention contemplates that the relative repositioning of the rolls 12a-12c in the second path may occur by moving more than one of the rolls 12a-12c along the second path. However, in the preferred embodiment, only the third roll 12c is moved in the second path.

The drive 38 has an extendible rod 44 that is connected to a carrier 46. A guide structure 48, described in greater detail below, cooperates with the carrier 46 to allow smooth and consistent guiding of the carrier 46 in the linear first path, identified with the double-headed arrow 32, relative to the frame 20.

Figure 5:
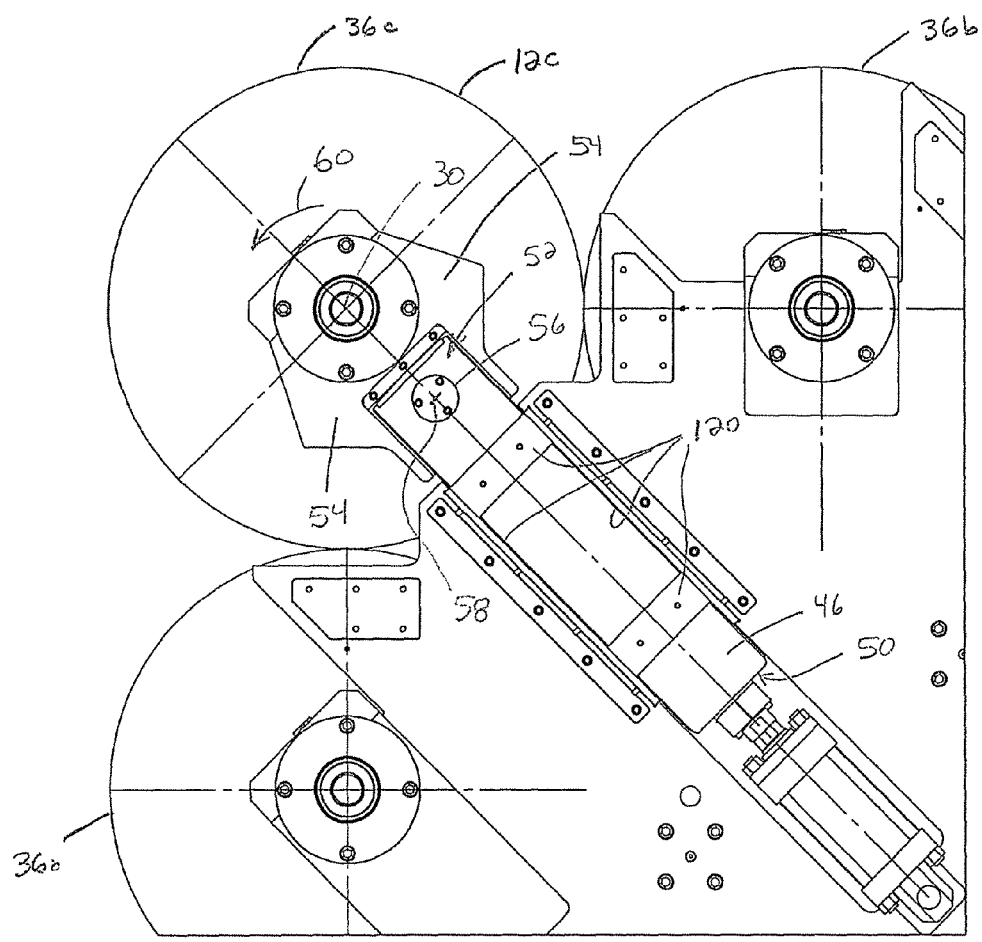
FIG. 5 is an enlarged view as in FIG. 4 wherein additional parts have been removed to further expose the adjusting mechanism.
Figure 6:
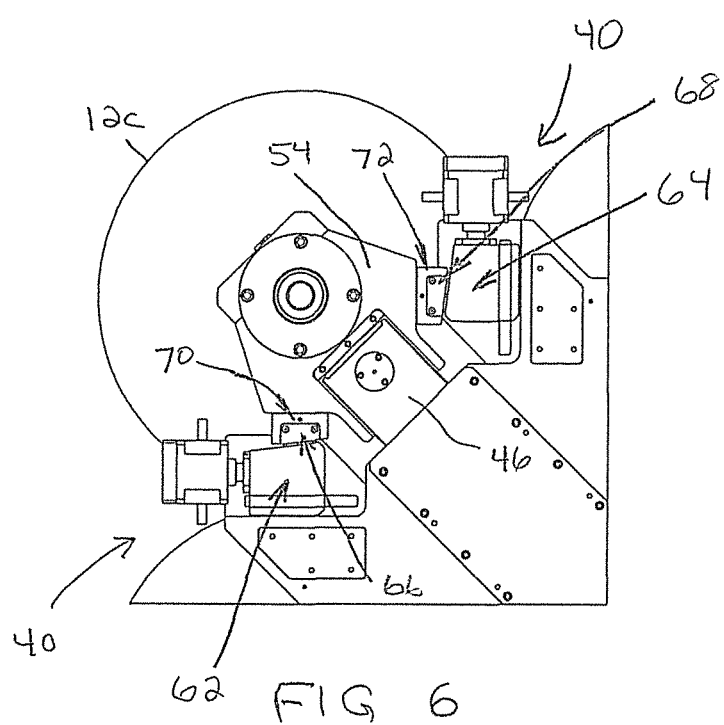
FIG. 6 is a reduced view as in FIG. 3 with the components of the adjusting mechanism in place.

As seen in FIG. 5, the carrier 46 has a first end 50 that is engaged and driven by the rod 44. The opposite end 52 of the carrier 46 supports a block 54, upon which the third roll 12c is mounted for rotation around the third axis 30. The block 54 has a pivot pin 56 projecting axially therefrom at a location spaced from the third axis 30. The pin 56 projects through the carrier end 52 and is guided for pivoting movement relative thereto around a fourth axis 58 that is spaced along the line of the first path from the third axis 30.

Pivoting of the block 54 in one direction in the second arcuate path, as indicated by the arrow 60, causes the gap G1 between the sheet engaging surfaces 36a, 36c to be reduced, whereas pivoting oppositely thereto reduces the dimension of the gap G2 between the sheet engaging surfaces 36b, 36c.

The control system 40 additionally includes first and second force applying units 62, 64, respectively. The force applying units 62, 64 are configured to respectively apply forces at first and second locations 66, 68, respectively, on the block 54, to thereby pivot the roll 12c in opposite directions about the axis 58. More specifically, the force applying units 62, 64 apply these pivoting forces to "targets" 70, 72, respectively at the first and second locations on the block 54. Each of the targets 70, 72 makes up a component on the block 54 that defines a cam surface. Exemplary target 72 has a part 74 that defines a surface S that cooperates with a surface S1 on a movable component 78 on the force applying unit 64.

On the force applying unit 64, an electromechanical operator 80 selectively extends and retracts a rod 82 connected to the component 78. A motorized ball screw drive is appropriate. The component 78 is guided along a rail 84 in a straight line path, parallel to the rod axis, as indicated by the double-headed arrow 86.

The surface S1 on the component 78 resides in a plane that is at an angle to the line of the path of the component 78. The plane of the surface S resides in a parallel plane. Accordingly, as the component 78 is moved in one direction in its linear path, as indicated by the arrow 88, the interaction of the surfaces S, S1 produces a camming action that applies a force to the target 72 on the block 54 in the direction of the arrow 60 in FIG. 5. This tends to increase the dimension of the gap G2 and narrow the dimension of the gap G1.

The force applying unit 62 cooperates with the target 70 on the block 54 at the first location in the same manner. An operator 90 is controlled to extend and retract a rod 92 to translate a component 94, corresponding to the component 78. By coordinating movement of the components 78, 94 through their respective operators 80, 90, the desired dimensions of the gaps G1, G2 can be established and maintained. That is, the simultaneous application of forces upon the separate targets 70, 72 stabilizes the block 54 with the roll 12c in the optimal selected relationship for the rolls 12a, 12b.

Figure 7:
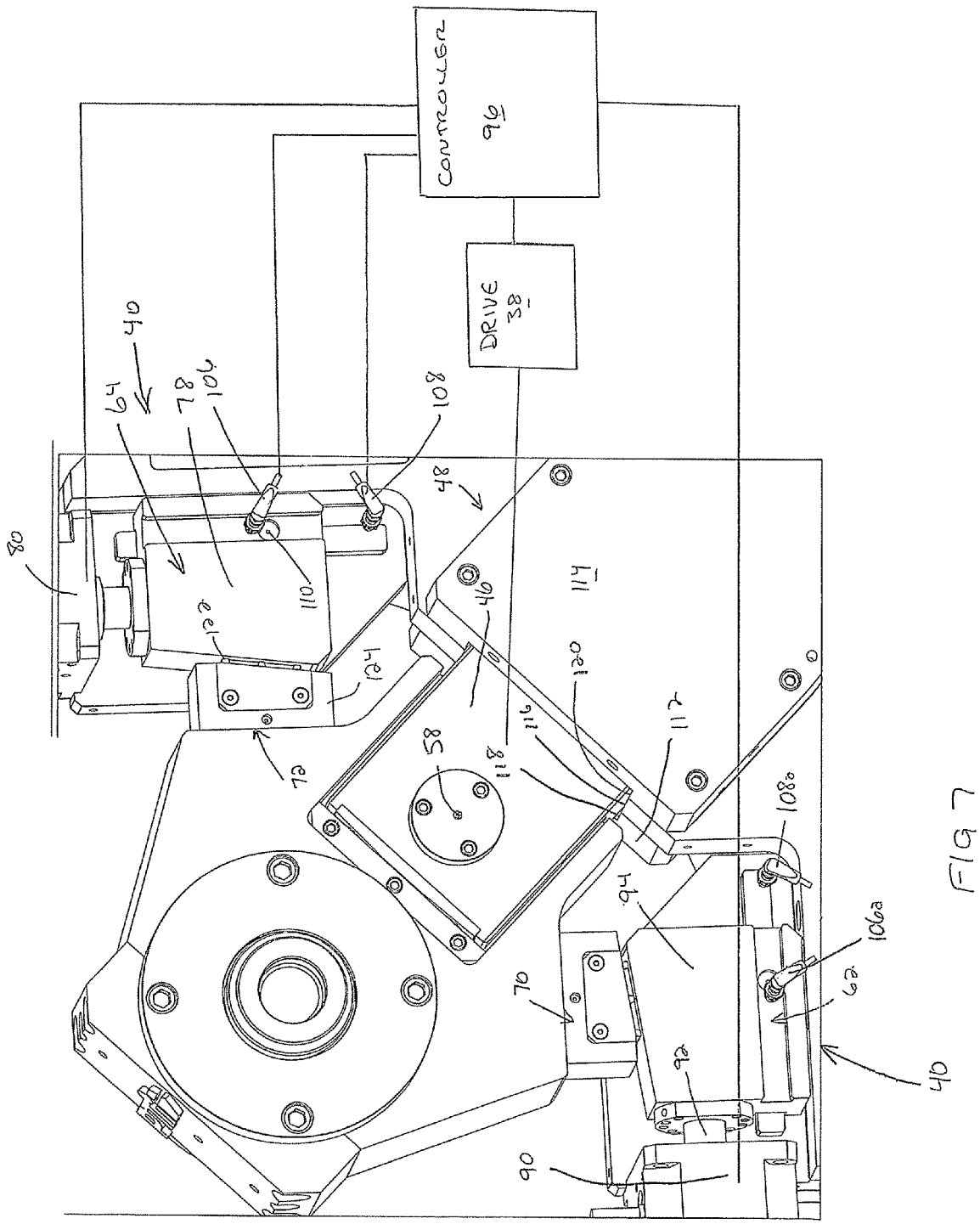
FIG. 7 is an enlarged, fragmentary, perspective view of the components in FIG. 6, with certain components removed and additional system components shown in schematic form, and with force applying units for moving one of the rolls shown in one state to produce maximum opposite repositioning forces upon the movable roll.

A controller 96, as shown schematically in FIG. 7, may be utilized to coordinate operation of the operators 80, 90 and drive 38. The controller 96 may be programmable to automatically open and close the rolls 12a-12c and set and maintain selected dimensions for the gaps G1, G2. The controller 96 may relatively move the rolls 12a-12c in response to signals from sensors, as described below.

Figure 13:
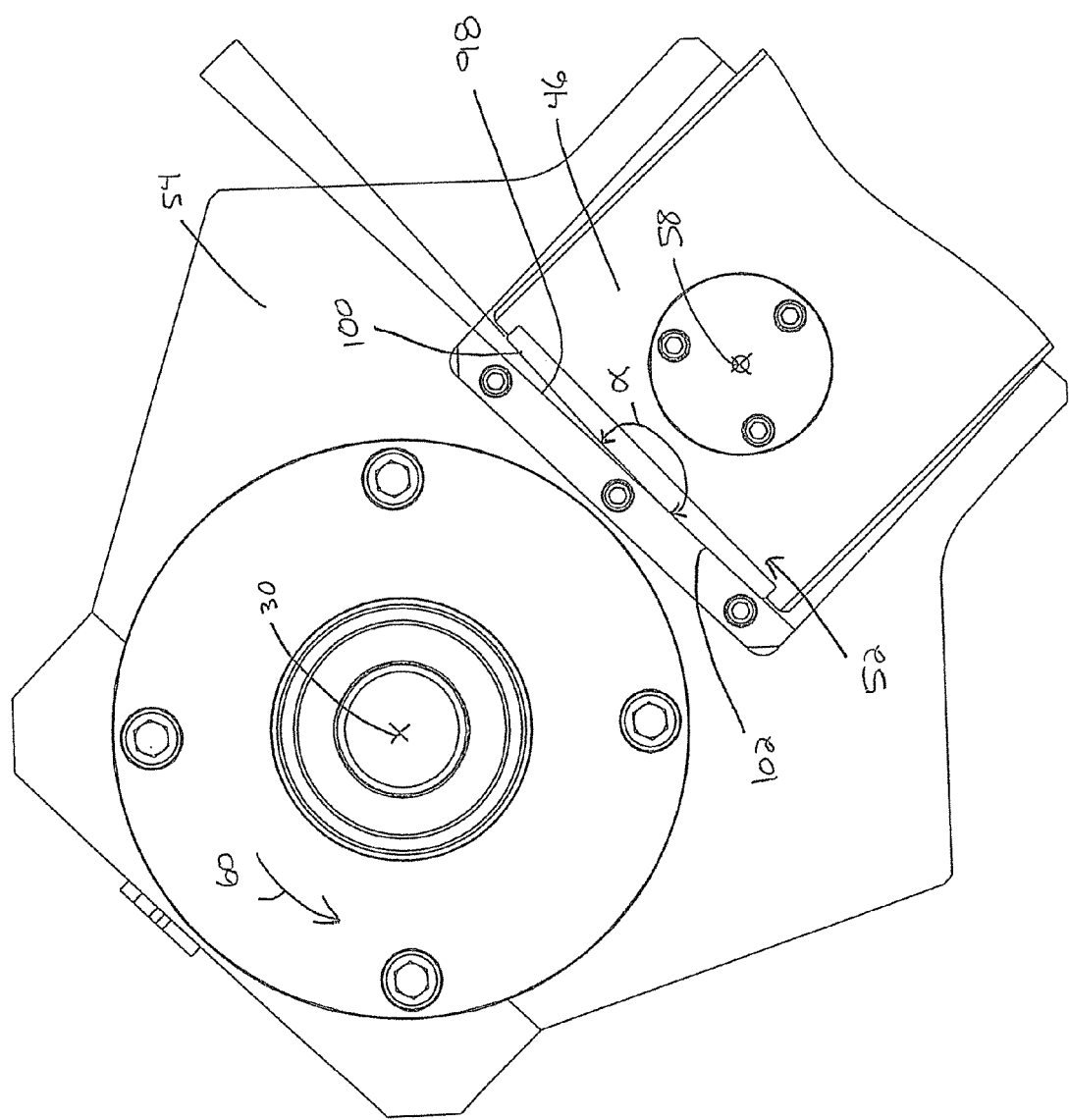

The force applying units 62, 64 are operable in one manner to simultaneously exert stabilizing forces upon the block 54 at the first and second locations 66, 68, throughout an operating pivot range for the block 54. The limits of the operating pivot range for the block 54 are established by providing a surface 98 on the block 54, as shown in FIG. 13, that cooperates separately with surfaces 100, 102 at the end 52 of the carrier 46. The surfaces 100, 102 are angled with respect to each other and have an included angle α that is less than 180°. The pivot range angle is equal to 180° minus α. The surfaces 98, 100, 102 are situated so that as the block pivots around the fourth axis 58 in the direction of the arrow 60, the surface 100 on the block 54 abuts to the carrier surface 102. Pivoting in the opposite direction causes the surfaces 98, 100 to abut. The surfaces 98, 100, 102 are situated so that the block 54 is pivotable through an equal range from a neutral position, wherein a line through the axes 30, 58 is parallel to the line of the first travel path, as indicated by the double-headed arrow 32 in FIG. 3.

Operation of the force applying units 62, 64 can be coordinated so that they cooperatively produce forces on the block 54 that additionally cause it to translate generally along the line of the first path of the roll 12c, as indicated by the double-headed arrow 32 (FIG. 3). For example, as both force applying units 62, 64 are operated to increase force application at the first and second block locations, a component of force is developed at each location that urges the block 54 and roll 12c generally in the direction of the arrow 34 in FIG. 3, thereby to increase the dimension of the gaps G1, G2. This may be to take up any play that exists or to more precisely set the dimensions of the gaps G1, G2. If the force applying units 62, 64 are not correspondingly set in their operating range, this force application will urge the block 54 and roll 12c in a slightly different line. Reducing force application at the first and second locations on the block 54 allows the block 54 and roll 12c to shift generally oppositely to the direction of the arrow 34 to close both gaps G1, G2. The drive 38 is preferably hydraulically operated and has a relief valve that allows the requisite translation of the block 54 under the force application at the first and second block locations.

The roll 12c is supported at its opposite ends by spherical roller bearings. These bearings avoid binding of the roll shaft side-to-side and translate out of plane loads to supporting elements as a result of a full roll skew, as when one side opens and the other side remains closed, as well as turning of the block 54 to permit adjacent gap adjustment. Partial or full roll skew may also result from malfunction of a drive 38.

Figure 14:
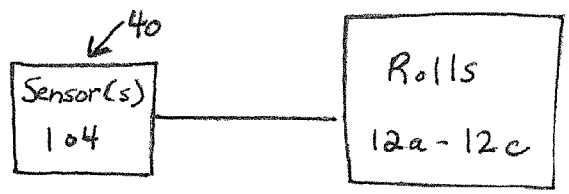
FIG. 14 is a schematic representation of sensors used to monitor relative position of the rolls.

As shown in schematic form in FIG. 14, one or more sensors 104, that are part of the control system 40, may be incorporated to sense the dimensions of the gaps G1, G2 and produce a signal that causes the controller 96 to coordinate operation of the drive 38 and operators 80, 90 to thereby automatically set the first and second gaps G1, G2 to preselected first and second dimensions. An exemplary sensor 104 may be in the form of a potentiometer that provides positional indications for tracking one or more set points for the gaps G1, G2.

Figure 8:
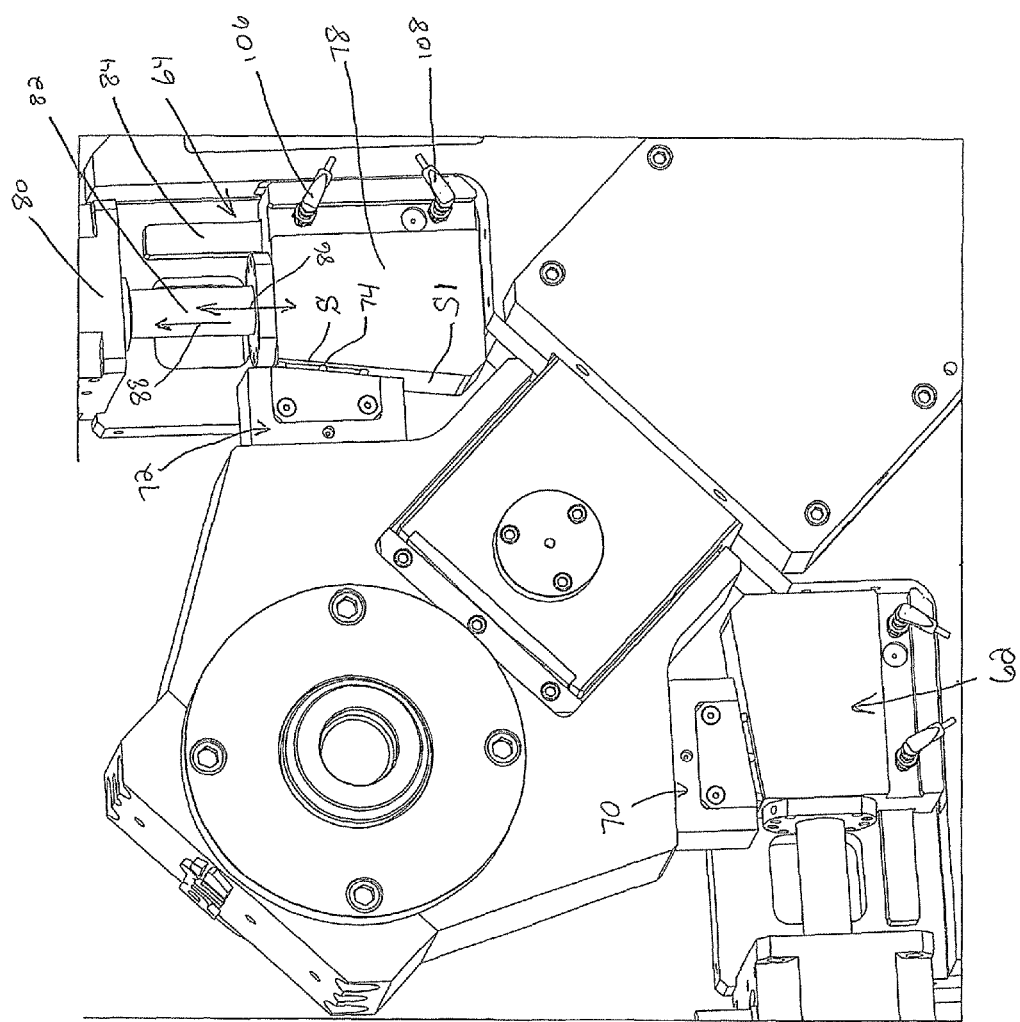
FIG. 8 is a view as in FIG. 7 with the force applying units each shown in another state to produce minimum opposite repositioning forces upon the movable roll.
Figure 9:
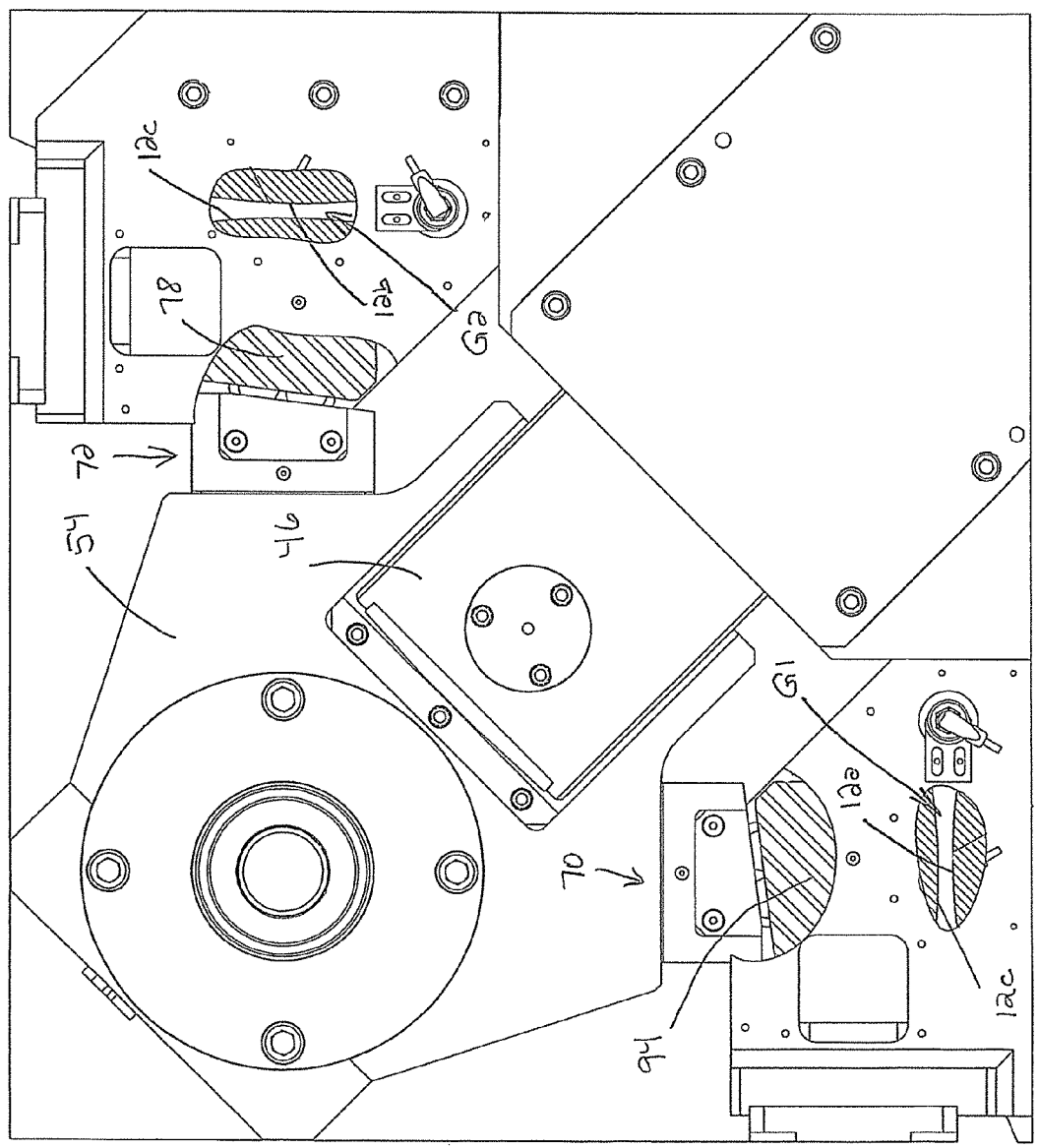
FIG. 9 is a side elevation view of the components in the FIG. 7 state and showing a maximum gap formation resulting between the movable rolls and the cooperating adjacent rolls, with structure broken away to show interaction of components and actual roll gaps.
Figure 10:
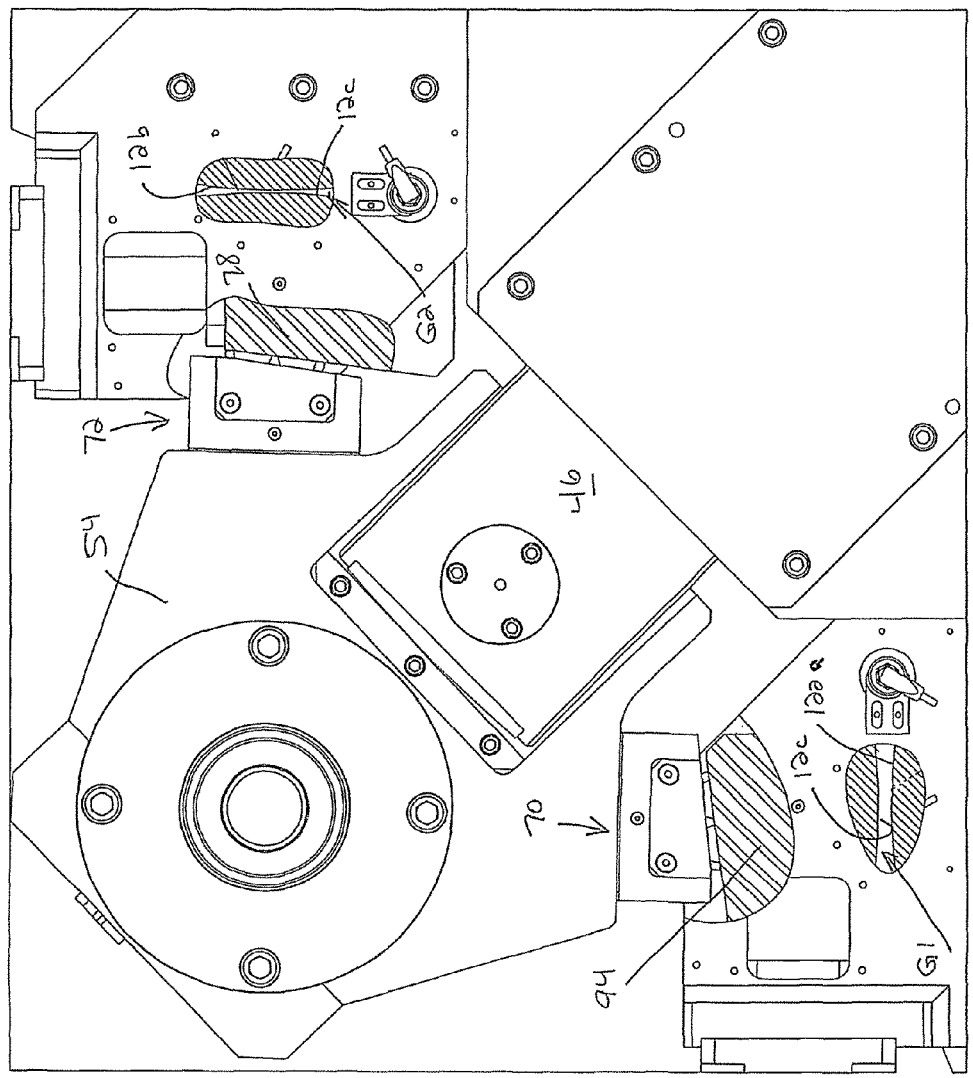
FIG. 10 is a view as in FIG. 9, wherein the force applying units are operated to produce a minimum roll gap between the movable roll and one of the adjacent rolls and a maximum roll gap between the movable roll and the other adjacent roll, with structure broken away to show cooperating components and actual roll gaps.
Figure 11:
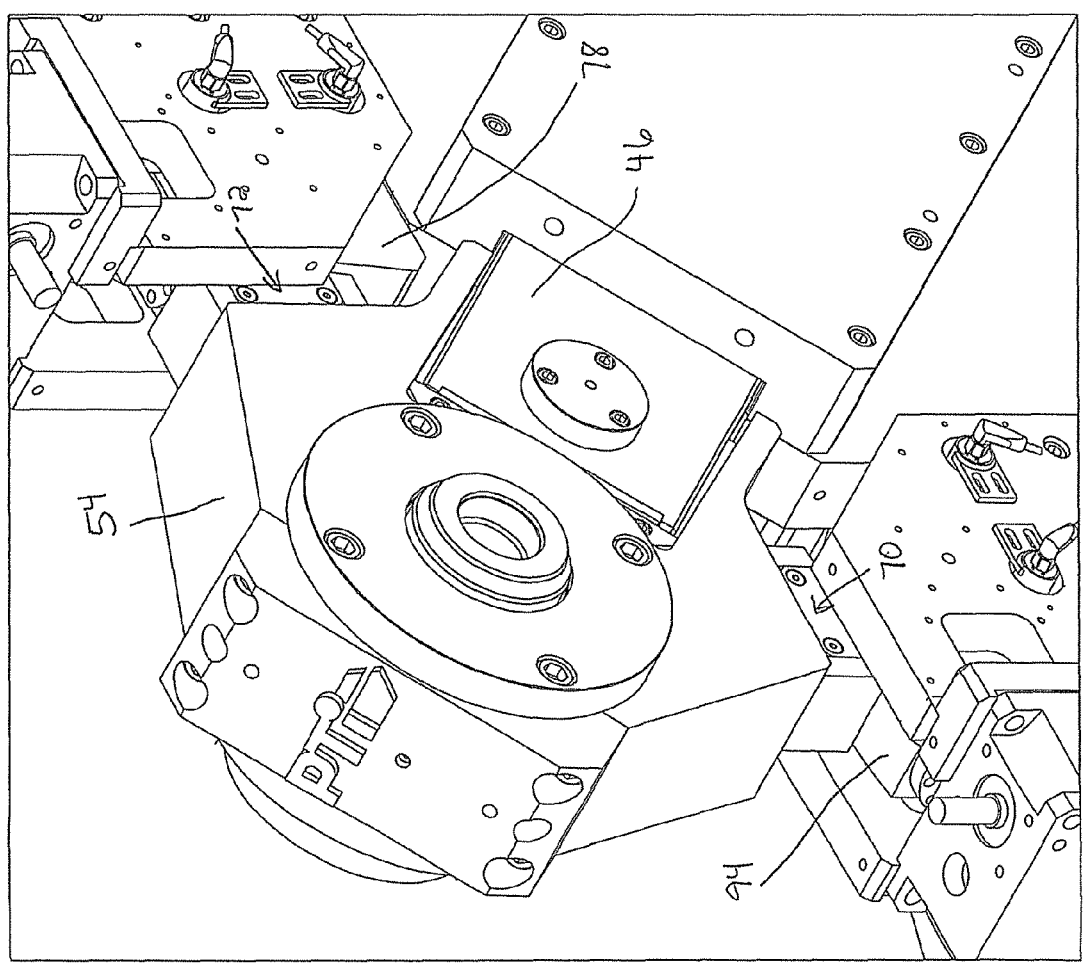
FIG. 11 is a view corresponding to that in FIG. 10 but from a slightly different perspective and with components, that are deleted in FIG. 10, in place.
Figure 12:
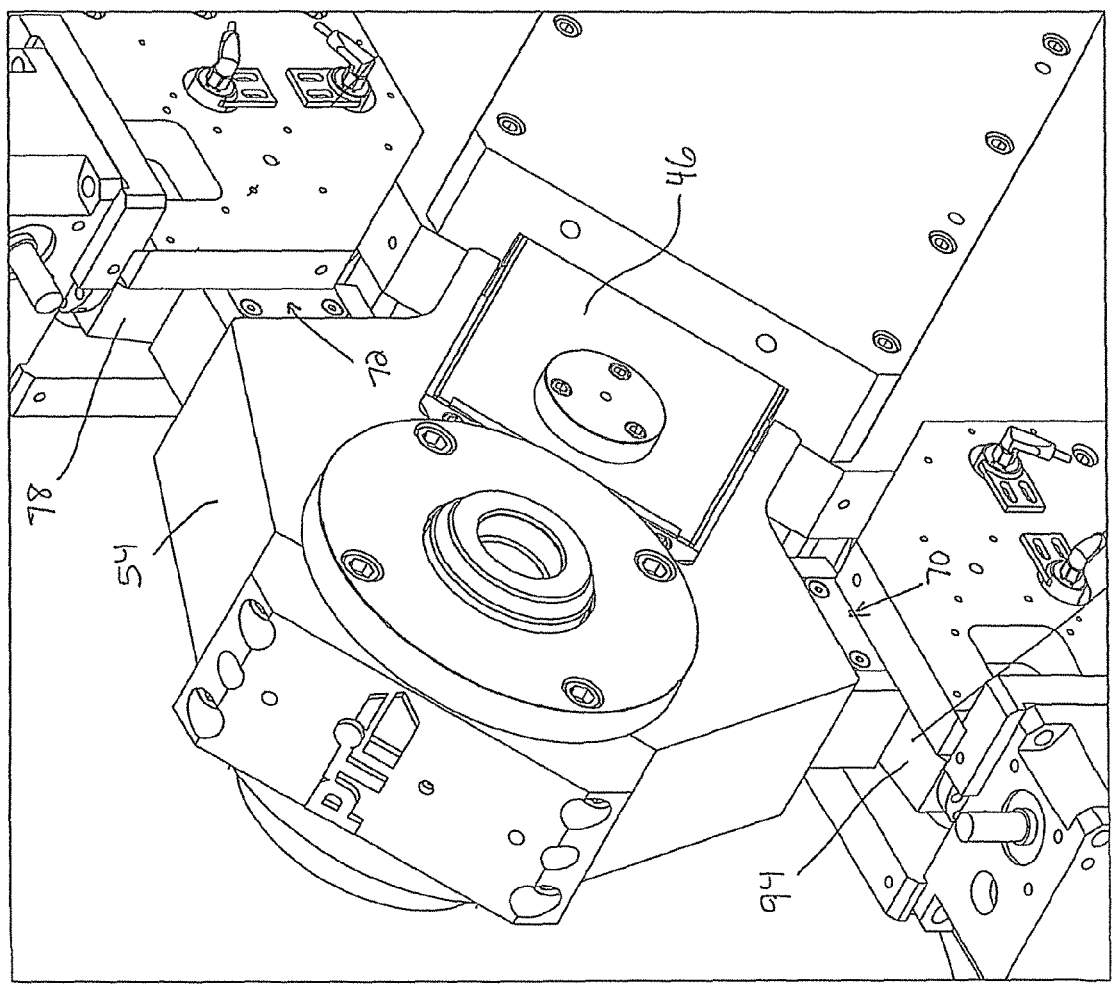
FIG. 12 corresponds to the view in FIG. 11 with the force applying units in the FIG. 9 state.

To avoid overrunning of the operators 80, 90, additional sensors may be utilized, as seen clearly in FIGS. 7-12. As shown for exemplary force applying unit 64 in FIGS. 7 and 8, separate maximum and minimum travel sensors 106, 108 are provided for the component 78. A target 110 on the component 78 is detected by the sensor 106 with the force applying unit 64 producing the maximum pivot force on the block 54, as shown in FIGS. 7, 9, and 12. The sensor 106 produces a signal that causes the controller 96 to disable the operator 80. At the opposite extreme of travel direction for the component 78, as shown in FIGS. 8, 10 and 11, the sensor 108 detects the target 110 and, through the controller 96, disables the operator 80. The dimensions of the gaps G1, G2 resulting from different states of the force applying units are shown in FIGS. 9 and 10.

Like sensors 106a, 108a are provided in association with the force applying unit 62 to control the operator 90 in like fashion through the controller 96.

While the above-described structure is described upon the frame part 22, a similar arrangement of components can be provided on the frame part 24 to operate simultaneously and in a coordinated manner therewith, so that both axial ends of all rolls 12a, 12b, 12c are relatively repositioned in like manner.

Various optional features are built into the above-described design to offer additional unique features and operating characteristics. The aforementioned guide structure 48 for the carrier 46 may incorporate special wear features. In the depicted embodiment, the depicted guide structure 48 consists of a cooperating pair of housing parts 112, 114 (FIG. 7) that block the carrier 46 within a frame opening 116. The housing parts 112, 114 define U-shaped guide slots 118, 120, respectively, that open towards each other. The guide slots 118, 120 are bounded by wear components 120, as seen in FIG. 5, with hardened wear surfaces that cooperatively bound a guide space for the carrier 46. The carrier portion 46 has flat surface portions on its periphery that cooperate with complementary guide surface portions on the wear components 120. The wear components 120 can be replaced by separating the housing parts 112, 114, thereby permitting maintenance of the structure with access gained readily from outside of the frame parts 22, 24. The housing parts 112, 114 additionally reinforce the frame part 22 around the opening 116 to assure that structural integrity is maintained during operation.

While the carrier 46 is shown with a rectangular peripheral shape, as seen in cross-section taken transversely to the line of the first path that the carrier 46 moves in, the invention contemplates any polygonal peripheral shape therefore that will provide a keying action that avoids skewing or turning of the carrier as it travels.

Figure 15:
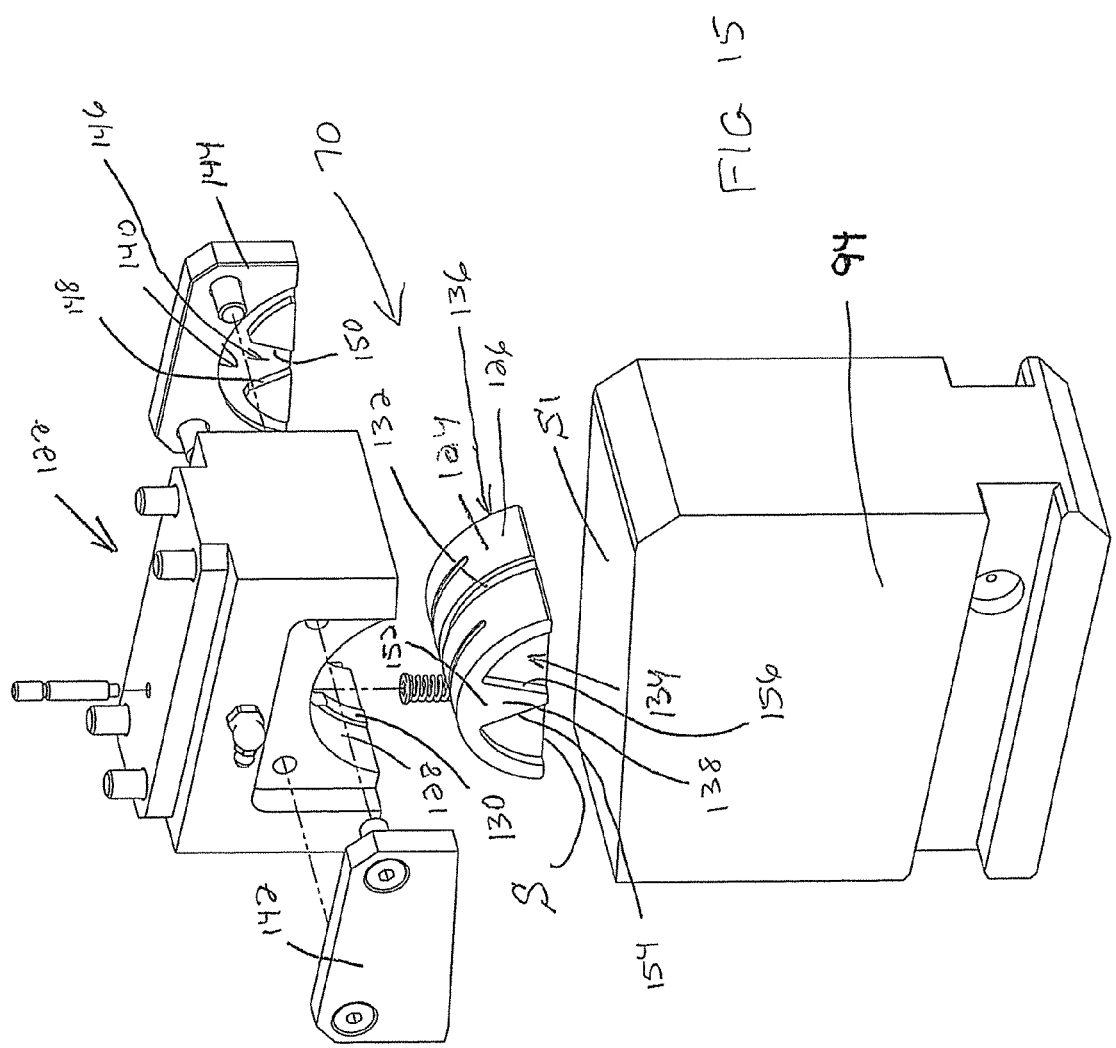
FIG. 15 is an enlarged, exploded, perspective view of one of the force applying units.
Figure 16:
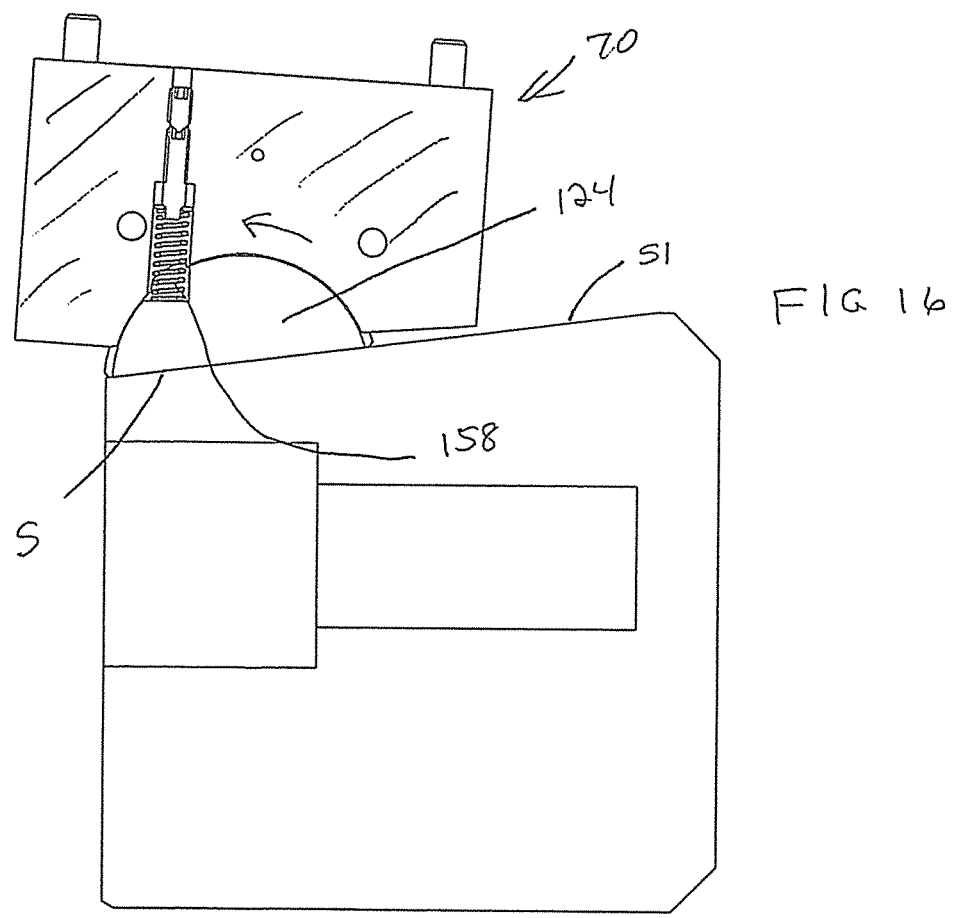
FIG. 16 is a side elevation view of the assembled components in FIG. 15 and with the force applying unit in one state to produce a minimum roll repositioning force.
Figure 17:
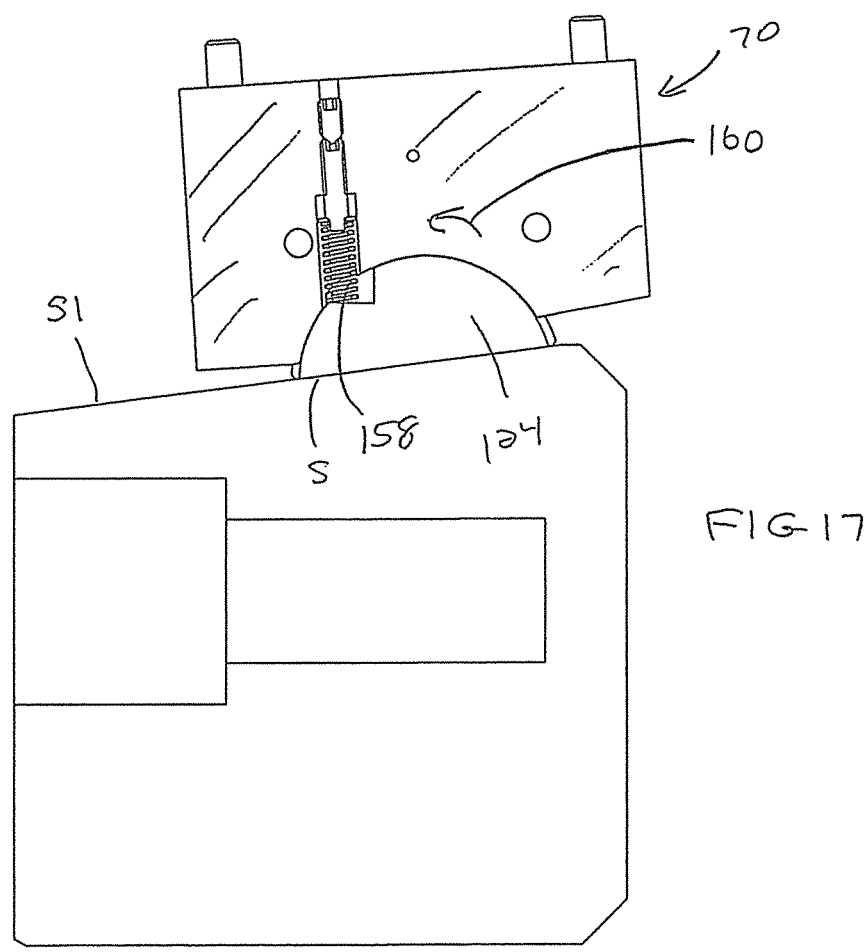
FIG. 17 is a view as in FIG. 16 wherein the force applying unit is in a state to produce a maximum roll repositioning force.

Each of the targets 70, 72 is constructed so that it does not hang up on its cooperating component 94, 78, respectively, as the block 54 is moved through its full operating range. The details of this structure are shown in FIGS. 15-17 for the exemplary target 70 and cooperating component 94. The target 70 has a surface S corresponding to the surface S on the target 72, with the component 94 having a surface S1 corresponding to the surface S1 on the component 78. The surface S, S1 are preferably hardened to reduce wear.

More specifically, the target 70 consists of a multi-part housing 122 that cooperates with a generally quonset-shaped part 124. The part 124 has an arcuate surface 126 that is guided against a complementary surface 128 on the housing 122. Through this arrangement, the part 124 pivots/floats to allow reorientation of the surface S relative to the housing 122 to maintain facial alignment with the surface S1 as the component 94 is moved during operation. A rib 130 on the housing 122 moves within a groove 132 through the surface 126 to prevent relative movement between the part 124 and housing 122 along an axis upon which the curvature of the surface 126 is centered.

At each of its sides 134, 136, the part 124 has like projecting, "M"-shaped bosses. The bosses 138 have the same construction, with one exemplary boss 138 seen on the side 134 in FIG. 15. The separate bosses 138 cooperate, one each, with receptacles 140 defined by separate housing parts 142, 144. One exemplary receptacle 140 is shown on the housing part 144 in FIG. 15, with a like receptacle (not shown) provided on the housing part 142 to cooperate with the boss 138 at the side 134.

Each receptacle 140 has a "V"-shaped center portion 146 bounded by edges 148, 150. Each boss 138 has a complementary "V"-shaped portion 152 bounded by edges 154, 156. The included angle between the edges 148, 150 is greater than that between the edges 154, 156 so that the part 124 is permitted to pivot within only a limited range before the edges 148, 150; 154, 156 abut as pivoting occurs in opposite directions.

A coil spring 158 biases the part 124 to pivot in one direction relative to the housing parts, as indicated by the arrow 160 in FIG. 17. This consistently urges the part 124 to a "home position".

In the absence of this feature, the parallel relationship of the surfaces S, S1 would not be maintained as the block 54 pivots between the FIG. 16 orientation, corresponding to that shown in FIG. 8, and the FIG. 17 position, corresponding to that in FIG. 7. Even though the pivot range for the block 54 is relatively small, hang-up or wedging might result if the surfaces S were fixed on their respective targets 70, 72 and the block 54, which the targets 70, 72 are a part of.

The invention also contemplates that the relatively movable parts that produce the camming action could be reversed in orientation from what is shown and described. For example, the target 72 associated with the exemplary force applying unit 64 could be movable relative to the block 54, with the component 78 remaining stationary. Likewise the surface-forming part could be on a moving component.

The invention also contemplates that the control system, which is described as automated herein, could be manual in nature. That is, movement of the carrier 46 in its linear path could be effected by manual operation. Likewise, the forces generated against the block 54 may be generated through a manual input.

Figure 18:
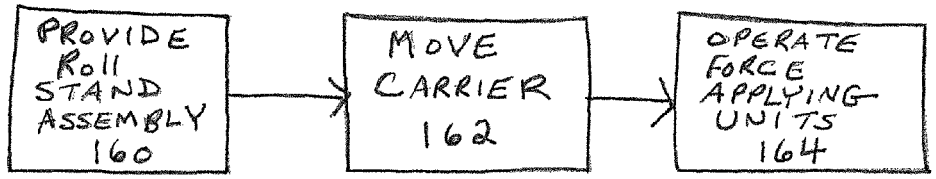
FIG. 18 is a schematic representation of a method of operating a roll stand assembly, according to the invention.

With the structure described above, the roll stand assembly can be operated as shown in flow diagram form in FIG. 18. As shown at block 160, a roll stand assembly is provided, as described above. As shown at block 162, with the third roll in an open position spaced from the first and second rolls to permit access to between the first, second, and third rolls, the carrier is moved so as to move the third roll closer to each of the first and second rolls. As shown at block 164, the first and second force applying units are operated to set the first and second gaps to a desired operating dimension.

As noted above, the method steps can be carried out manually or by using a controller, such as one that can be programmed by an operator.

The foregoing disclosure of specific embodiments is intended to be illustrative of the broad concepts comprehended by the invention.

The invention claimed is:

1. A roll stand assembly for processing a sheet product, the roll stand assembly comprising:
   a frame;
   a plurality of rolls operatively positioned on the frame so as to define a plurality of nip locations between cooperating pairs of the rolls,
   the plurality of rolls comprising: a) a first roll with a first axis; b) a second roll with a second axis; and c) a third roll with a third axis,
   the first, second, and third axes substantially parallel with the plurality of rolls operatively positioned on the frame,
   two of the rolls relatively repositionable by guided relative movement therebetween along a first path to vary a gap between the two rolls,
   the two rolls relatively repositionable by guided relative movement therebetween along a second path that is different than the first path to vary the gap between the two rolls; and
   a control system through which the two rolls are relatively repositioned by causing guided relative movement between the two rolls in the first and second paths.

2. The roll stand assembly according to claim 1 wherein the first path extends in a substantially straight line and the second path is transverse to the straight line.

3. The roll stand assembly according to claim 2 wherein the second path is arcuate.

4. The roll stand assembly according to claim 1 wherein the first and second axes are substantially fixed with respect to the frame and the third roll is movable relative to the first and second rolls in the first path to thereby vary: a) a first gap between the first and third roll; and b) a second gap between the second and third roll.

5. The roll stand assembly according to claim 4 wherein the third roll is movable in a substantially straight line in the first path.

6. The roll stand assembly according to claim 5 wherein the third roll is supported on a block that is in turn supported on a carrier, the carrier is movable in the straight line in the first path and the block is movable guidingly relative to the carrier to cause the third roll to move in the second path.

7. The roll stand assembly according to claim 6 wherein the block is mounted to the carrier for guided movement around a fourth axis that is spaced from and parallel to the third axis.

8. The roll stand assembly according to claim 7 wherein the control system comprises first and second force applying units that are engagable with the block respectively at first and second spaced locations, the first force applying unit operable to exert a force upon the block at the first location that urges the block in one pivoting direction around the fourth axis, the second force applying unit operable to exert a force upon the block at the second location that urges the block in a pivoting direction opposite to the one pivoting direction around the fourth axis.

9. The roll stand assembly according to claim 8 wherein the first and second force applying units are operable to simultaneously exert forces upon the block at the first and second locations throughout an operating pivot range for the block around the fourth axis.

10. The roll stand assembly according to claim 9 wherein the first force applying unit comprises a first component that is movable relative to a second component to cause first and second surfaces, respectively on the first and second components, to move one against the other to thereby produce a camming action that generates the force upon the block at the first location.

11. The roll stand assembly according to claim 10 wherein the second component moves as a unit with the block at the first location and the first component is movable relative to the second component and block to thereby produce the camming action.

12. The roll stand assembly according to claim 11 wherein one of the first and second surfaces is defined on a part that is movable on its respective component to avoid hangup between the first and second surfaces as the first and second surfaces are moved against each other.

13. The roll stand assembly according to claim 8 wherein there are surfaces on the block and carrier that abut to limit pivoting movement of the block both in: a) the one pivoting direction; and b) the pivoting direction opposite to the one pivoting direction.

14. The roll stand assembly according to claim 8 wherein the frame comprises first and second frame parts that are spaced axially relative to the rolls, each roll in the plurality of rolls spans between the first and second frame parts, the carrier, block and first and second force applying units are on the first frame part and there is substantially the same arrangement of carrier, block and force applying units on the second frame part as on the first frame part.

15. The roll stand assembly according to claim 12 wherein the part is pivoted relative to another part on its respective component and biased in one pivoting direction.

16. The roll stand assembly according to claim 6 wherein the carrier has a polygonal peripheral shape as seen in cross-section taken transversely to the straight line and defined by a plurality of flat surface portions and a guide structure is provided on the frame and defines a plurality of guide surface portions that each cooperates with one of the flat surface portions to cause the carrier to be guided in movement relative to the frame in the straight line.

17. The roll stand assembly according to claim 8 wherein the control system comprises a drive for moving the carrier, an operator for each of the first and second force applying units and a controller for coordinating operation of the drive and the operators for the first and second force applying units.

18. The roll stand assembly according to claim 17 wherein the control system comprises at least one sensor that causes the controller to coordinate operation of the drive and the operators to automatically set the first and second gaps to preselected first and second dimensions.

19. A method of operating a roll stand assembly, the method comprising the steps of:

providing a roll stand assembly as recited in claim 8;

with the third roll in an open position spaced from the first and second rolls to permit access to between the first, second, and third rolls, moving the carrier so as to move the third roll closer to each of the first and second rolls; and operating the first and second force applying units to set the first and second gaps to a desired operating dimension.

20. The method of operating a roll stand assembly according to claim 19 wherein the step of providing a roll stand assembly comprises providing a roll stand assembly wherein the control system comprises a drive for moving the carrier, an operator for each of the first and second force applying units and a controller for coordinating operation of the drive and operators for the first and second force applying units, and the steps of moving the carrier and operating the first and second force applying units comprises moving the carrier and operating the first and second force applying units automatically through programmed operation of the controller.

* * * * *